US008713668B2

(12) United States Patent
Cooper et al.

(10) Patent No.: US 8,713,668 B2
(45) Date of Patent: *Apr. 29, 2014

(54) SYSTEM AND METHOD FOR REDIRECTED FIREWALL DISCOVERY IN A NETWORK ENVIRONMENT

(75) Inventors: Geoffrey Cooper, Palo Alto, CA (US); Michael W. Green, Shoreview, MN (US); John Richard Guzik, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/275,249

(22) Filed: Oct. 17, 2011

(65) Prior Publication Data

US 2013/0097658 A1    Apr. 18, 2013

(51) Int. Cl.
*H04L 29/06* (2006.01)
(52) U.S. Cl.
USPC ............. 726/14; 726/11; 726/12; 726/13
(58) Field of Classification Search
USPC .................................................. 726/11–14
See application file for complete search history.

(56) References Cited

U.S. PATENT DOCUMENTS

| | | | |
|---|---|---|---|
| 4,688,169 A | 8/1987 | Joshi | |
| 4,982,430 A | 1/1991 | Frezza et al. | |
| 5,155,847 A | 10/1992 | Kirouac et al. | |
| 5,222,134 A | 6/1993 | Waite et al. | |
| 5,390,314 A | 2/1995 | Swanson | |
| 5,521,849 A | 5/1996 | Adelson et al. | |
| 5,560,008 A | 9/1996 | Johnson et al. | |
| 5,699,513 A | 12/1997 | Feigen et al. | |
| 5,778,226 A | 7/1998 | Adams et al. | |
| 5,778,349 A | 7/1998 | Okonogi | |
| 5,787,427 A | 7/1998 | Benantar et al. | |
| 5,842,017 A | 11/1998 | Hookway et al. | |
| 5,907,709 A | 5/1999 | Cantey et al. | |
| 5,907,860 A | 5/1999 | Garibay et al. | |

(Continued)

FOREIGN PATENT DOCUMENTS

| | | |
|---|---|---|
| CN | 1383295 A | 12/2002 |
| CN | 103283202 A | 9/2013 |

(Continued)

OTHER PUBLICATIONS

Rescorla et al., RFC 4347—Datagram Transport Layer Security, Apr. 2006, retrieved from http://tools.ietf.org/html/rfc4347.*

(Continued)

*Primary Examiner* — Chau Le
(74) *Attorney, Agent, or Firm* — Patent Capital Group

(57) ABSTRACT

A method is provided in one example embodiment that includes receiving metadata from a host over a metadata channel. The metadata may be correlated with a network flow and a network policy may be applied to the connection. In other embodiments, a network flow may be received from a host without metadata associated with the flow, and a discovery redirect may be sent to the host. Metadata may then be received and correlated with the flow to identify a network policy action to apply to the flow.

21 Claims, 6 Drawing Sheets

(56) References Cited

U.S. PATENT DOCUMENTS

| | | |
|---|---|---|
| 5,926,832 A | 7/1999 | Wing et al. |
| 5,944,839 A | 8/1999 | Isenberg |
| 5,974,149 A | 10/1999 | Leppek |
| 5,987,610 A | 11/1999 | Franczek et al. |
| 5,987,611 A | 11/1999 | Freund |
| 5,991,881 A | 11/1999 | Conklin et al. |
| 6,064,815 A | 5/2000 | Hohensee et al. |
| 6,073,142 A | 6/2000 | Geiger et al. |
| 6,141,698 A | 10/2000 | Krishnan et al. |
| 6,192,401 B1 | 2/2001 | Modiri et al. |
| 6,192,475 B1 | 2/2001 | Wallace |
| 6,256,773 B1 | 7/2001 | Bowman-Amuah |
| 6,275,938 B1 | 8/2001 | Bond et al. |
| 6,321,267 B1 | 11/2001 | Donaldson |
| 6,338,149 B1 | 1/2002 | Ciccone, Jr. et al. |
| 6,356,957 B2 | 3/2002 | Sanchez, II et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 6,460,050 B1 | 10/2002 | Pace et al. |
| 6,496,477 B1 | 12/2002 | Perkins et al. |
| 6,587,877 B1 | 7/2003 | Douglis et al. |
| 6,611,925 B1 | 8/2003 | Spear |
| 6,658,645 B1 | 12/2003 | Akuta et al. |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 | 8/2005 | Rathi et al. |
| 6,934,755 B1 | 8/2005 | Saulpaugh et al. |
| 6,988,101 B2 | 1/2006 | Ham et al. |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,054,930 B1 | 5/2006 | Cheriton |
| 7,065,767 B2 | 6/2006 | Kambhammettu et al. |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,340,684 B2 | 3/2008 | Ramamoorthy et al. |
| 7,346,781 B2 | 3/2008 | Cowie et al. |
| 7,349,931 B2 | 3/2008 | Horne |
| 7,350,204 B2 | 3/2008 | Lambert et al. |
| 7,353,501 B2 | 4/2008 | Tang et al. |
| 7,363,022 B2 | 4/2008 | Whelan et al. |
| 7,370,360 B2 | 5/2008 | van der Made |
| 7,385,938 B1 | 6/2008 | Beckett et al. |
| 7,406,517 B2 | 7/2008 | Hunt et al. |
| 7,441,265 B2 | 10/2008 | Staamann et al. |
| 7,464,408 B1 | 12/2008 | Shah et al. |
| 7,506,155 B1 | 3/2009 | Stewart et al. |
| 7,506,170 B2 | 3/2009 | Finnegan |
| 7,506,364 B2 | 3/2009 | Vayman |
| 7,546,333 B2 | 6/2009 | Alon et al. |
| 7,546,594 B2 | 6/2009 | McGuire et al. |
| 7,552,479 B1 | 6/2009 | Conover et al. |
| 7,577,995 B2 | 8/2009 | Chebolu et al. |
| 7,603,552 B1 | 10/2009 | Sebes et al. |
| 7,607,170 B2 | 10/2009 | Chesla |
| 7,657,599 B2 | 2/2010 | Smith |
| 7,669,195 B1 | 2/2010 | Qumei |
| 7,685,635 B2 | 3/2010 | Vega et al. |
| 7,698,744 B2 | 4/2010 | Fanton et al. |
| 7,703,090 B2 | 4/2010 | Napier et al. |
| 7,739,497 B1 * | 6/2010 | Fink et al. ................. 713/162 |
| 7,757,269 B1 | 7/2010 | Roy-Chowdhury et al. |
| 7,765,538 B2 | 7/2010 | Zweifel et al. |
| 7,783,735 B1 | 8/2010 | Sebes et al. |
| 7,809,704 B2 | 10/2010 | Surendran et al. |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,840,968 B1 | 11/2010 | Sharma et al. |
| 7,849,507 B1 | 12/2010 | Bloch et al. |
| 7,853,643 B1 | 12/2010 | Martinez et al. |
| 7,856,661 B1 | 12/2010 | Sebes et al. |
| 7,865,931 B1 | 1/2011 | Stone et al. |
| 7,870,387 B1 | 1/2011 | Bhargava et al. |
| 7,873,955 B1 | 1/2011 | Sebes |
| 7,895,573 B1 | 2/2011 | Bhargava et al. |
| 7,908,653 B2 | 3/2011 | Brickell et al. |
| 7,937,455 B2 | 5/2011 | Saha et al. |
| 7,950,056 B1 | 5/2011 | Satish et al. |
| 7,966,659 B1 | 6/2011 | Wilkinson et al. |
| 7,996,836 B1 | 8/2011 | McCorkendale et al. |
| 8,015,388 B1 | 9/2011 | Rihan et al. |
| 8,015,563 B2 | 9/2011 | Araujo et al. |
| 8,028,340 B2 | 9/2011 | Sebes et al. |
| 8,195,931 B1 | 6/2012 | Sharma et al. |
| 8,205,188 B2 | 6/2012 | Ramamoorthy et al. |
| 8,234,713 B2 | 7/2012 | Roy-Chowdhury et al. |
| 8,307,437 B2 | 11/2012 | Sebes et al. |
| 8,321,932 B2 | 11/2012 | Bhargava et al. |
| 8,332,929 B1 | 12/2012 | Bhargava et al. |
| 8,352,930 B1 | 1/2013 | Sebes et al. |
| 8,381,284 B2 | 2/2013 | Dang et al. |
| 8,515,075 B1 | 8/2013 | Saraf et al. |
| 8,539,063 B1 | 9/2013 | Sharma et al. |
| 8,544,003 B1 | 9/2013 | Sawhney et al. |
| 8,549,003 B1 | 10/2013 | Bhargava et al. |
| 8,549,546 B2 | 10/2013 | Sharma et al. |
| 8,555,404 B1 | 10/2013 | Sebes et al. |
| 8,561,051 B2 | 10/2013 | Sebes et al. |
| 8,561,082 B2 | 10/2013 | Sharma et al. |
| 2002/0056076 A1 | 5/2002 | van der Made |
| 2002/0069367 A1 | 6/2002 | Tindal et al. |
| 2002/0083175 A1 | 6/2002 | Afek et al. |
| 2002/0099671 A1 | 7/2002 | Mastin Crosbie et al. |
| 2002/0114319 A1 * | 8/2002 | Liu et al. ................. 370/352 |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0065945 A1 | 4/2003 | Lingafelt et al. |
| 2003/0073894 A1 | 4/2003 | Chiang et al. |
| 2003/0074552 A1 | 4/2003 | Olkin et al. |
| 2003/0115222 A1 | 6/2003 | Oashi et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |
| 2004/0051736 A1 | 3/2004 | Daniell |
| 2004/0054928 A1 | 3/2004 | Hall |
| 2004/0088398 A1 | 5/2004 | Barlow |
| 2004/0139206 A1 | 7/2004 | Claudatos et al. |
| 2004/0143749 A1 | 7/2004 | Tajalli et al. |
| 2004/0167906 A1 | 8/2004 | Smith et al. |

(56) References Cited

U.S. PATENT DOCUMENTS

| | | |
|---|---|---|
| 2004/0172551 A1 | 9/2004 | Fielding et al. |
| 2004/0230963 A1 | 11/2004 | Rothman et al. |
| 2004/0243678 A1 | 12/2004 | Smith |
| 2004/0255161 A1 | 12/2004 | Cavanaugh |
| 2004/0268149 A1* | 12/2004 | Aaron .......................... 713/201 |
| 2005/0005006 A1* | 1/2005 | Chauffour et al. ............ 709/223 |
| 2005/0018651 A1 | 1/2005 | Yan et al. |
| 2005/0086047 A1 | 4/2005 | Uchimoto et al. |
| 2005/0091321 A1 | 4/2005 | Daniell et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0198519 A1 | 9/2005 | Tamura et al. |
| 2005/0228990 A1 | 10/2005 | Kato et al. |
| 2005/0235360 A1 | 10/2005 | Pearson |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0072451 A1 | 4/2006 | Ross |
| 2006/0075478 A1* | 4/2006 | Hyndman et al. ............... 726/11 |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0143713 A1 | 6/2006 | Challener et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2006/0277603 A1* | 12/2006 | Kelso et al. ...................... 726/13 |
| 2007/0011746 A1 | 1/2007 | Malpani et al. |
| 2007/0028303 A1 | 2/2007 | Brennan |
| 2007/0033645 A1 | 2/2007 | Jones |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0157303 A1* | 7/2007 | Pankratov ....................... 726/11 |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0034418 A1 | 2/2008 | Venkatraman et al. |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0141371 A1 | 6/2008 | Bradicich et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0282080 A1 | 11/2008 | Hyndman et al. |
| 2008/0294703 A1 | 11/2008 | Craft et al. |
| 2008/0301770 A1 | 12/2008 | Kinder |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0063665 A1* | 3/2009 | Bagepalli et al. ............. 709/222 |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0249053 A1 | 10/2009 | Zimmer et al. |
| 2009/0249438 A1 | 10/2009 | Litvin et al. |
| 2009/0320140 A1 | 12/2009 | Sebes et al. |
| 2009/0328144 A1 | 12/2009 | Sherlock et al. |
| 2009/0328185 A1 | 12/2009 | van den Berg et al. |
| 2010/0049973 A1* | 2/2010 | Chen ............................. 713/163 |
| 2010/0071035 A1 | 3/2010 | Budko et al. |
| 2010/0100970 A1 | 4/2010 | Chowdhury et al. |
| 2010/0114825 A1 | 5/2010 | Siddegowda |
| 2010/0138430 A1 | 6/2010 | Gotou |
| 2010/0188976 A1 | 7/2010 | Rahman et al. |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047542 A1 | 2/2011 | Dang et al. |
| 2011/0047543 A1 | 2/2011 | Mohinder |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2011/0302647 A1* | 12/2011 | Bhattacharya et al. ......... 726/11 |
| 2012/0030731 A1 | 2/2012 | Bhargava et al. |
| 2012/0030750 A1 | 2/2012 | Bhargava et al. |
| 2012/0216271 A1 | 8/2012 | Cooper et al. |
| 2012/0278853 A1 | 11/2012 | Chowdhury et al. |
| 2012/0290827 A1 | 11/2012 | Bhargava et al. |
| 2012/0290828 A1 | 11/2012 | Bhargava et al. |
| 2012/0297176 A1 | 11/2012 | Bhargava et al. |
| 2013/0024934 A1 | 1/2013 | Sebes et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0097692 A1 | 4/2013 | Cooper et al. |
| 2013/0117823 A1 | 5/2013 | Dang et al. |
| 2013/0246044 A1 | 9/2013 | Sharma et al. |
| 2013/0246393 A1 | 9/2013 | Saraf et al. |
| 2013/0246423 A1 | 9/2013 | Bhargava et al. |
| 2013/0246685 A1 | 9/2013 | Bhargava et al. |
| 2013/0247016 A1 | 9/2013 | Sharma et al. |
| 2013/0247027 A1 | 9/2013 | Shah et al. |
| 2013/0247032 A1 | 9/2013 | Bhargava et al. |
| 2013/0247181 A1 | 9/2013 | Saraf et al. |
| 2013/0247192 A1 | 9/2013 | Krasser et al. |
| 2013/0247226 A1 | 9/2013 | Sebes et al. |

FOREIGN PATENT DOCUMENTS

| | | |
|---|---|---|
| EP | 1 482 394 A2 | 12/2004 |
| EP | 2 037 657 A1 | 3/2009 |
| EP | 2599026 | 6/2013 |
| EP | 2599276 | 6/2013 |
| JP | 2004/524598 A | 8/2004 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |

(56) References Cited

FOREIGN PATENT DOCUMENTS

| WO | 2012/116098 A1 | 8/2012 |
|---|---|---|
| WO | 2013/058940 A1 | 4/2013 |
| WO | 2013/058944 A1 | 4/2013 |

OTHER PUBLICATIONS

Narten et al., RFC 4861—Neighbor Discovery for IP version 6 (IPv6), Sep. 2007, retrieved from http://tools.ietf.org/html/rfc4861.*
USPTO Dec. 24, 2012 Nonfinal Office Action from U.S. Appl. No. 13/032,851.
International Search Report and Written Opinion, International Application No. PCT/US2012/057153, mailed Dec. 26, 2012, 8 pages.
International Search Report and Written Opinion, International Application No. PCT/U52012/057312, mailed Jan. 31, 2013, 10 pages.
International Search Report and Written Opinion, International Application No. PCT/US2012/026169, mailed Jun. 18, 2012, 11 pages.
U.S. Appl. No. 13/437,900, filed Apr. 2, 2012, entitled "System and Method for Interlocking a Host and a Gateway," Inventors: Geoffrey Howard Cooper, et al.
Datagram Transport Layer Security Request for Comments 4347, E. Rescorla, et al., Stanford University, Apr. 2006, retrieved and printed on Oct. 17, 2011 from http://tools.ietf.org/pdf/rfc4347.pdf, 26 pages.
Internet Control Message Protocol Request for Comments 792, J. Postel, ISI, Sep. 1981, retrieved and printed on Oct. 17, 2011 from http://tools.ietf.org/html/rfc792, 22 pages.
Mathew J. Schwartz, "Palo Alto Introduces Security for Cloud, Mobile Users," retrieved Feb. 9, 2011 from http://www.informationweek.com/news/security/perimeter/showArticle.jhtml?articleID-22, 4 pages.
Requirements for IV Version 4 Routers Request for Comments 1812, F. Baker, Cisco Systems, Jun. 1995, retrieved and printed on Oct. 17, 2011 from http://tools.ietf.org/pdf/rfc1812.pdf, 176 pages.
The Keyed-Hash Message Authentication Code (HMAC), FIPS PUB 198, Issued Mar. 6, 2002, Federal Information Processing Standards Publication, retrieved and printed on Oct. 17, 2011 from http://csrc.nist.gov/publications/fips/fips198/fips-198a.pdf, 20 pages.
U.S. Appl. No. 13/032,851, filed Feb. 23, 2011, entitled "System and Method for Interlocking a Host and a Gateway," Inventors: Geoffrey Howard Cooper, et al.
U.S. Appl. No. 13/275,196, filed Oct. 17, 2011, entitled "System and Method for Host-Initiated Firewall Discovery in a Network Environment," Inventors: Geoffrey Cooper, et al.
USPTO Mar. 1, 2013 Nonfinal Office Action from U.S. Appl. No. 13/437,900.
USPTO Mar. 1, 2013 Nonfinal Office Action from U.S. Appl. No. 13/275,196.
USPTO Mar. 25, 2013 Response to Dec. 24, 2012 Nonfinal Office Action from U.S. Appl. No. 13/032,851.
Office Action received for the U.S. Appl. No. 13/032,851, mailed on Jul. 16, 2013, 15 pages.
Response to the Office Action dated Mar. 1, 2013, received for the U.S. Appl. No. 13/437,900.
Response to the Office Action dated Mar. 1, 2013, received for the U.S. Appl. No. 13/275,196, 12 pages.
International Preliminary Report on Patentability and Written Opinion issued Jan. 29, 2013 for International Application No. PCT/US2011/024869 (6 pages).
Office Action received for U.S. Appl. No. 12/844,892, mailed on Jan. 17, 2013, 29 pages.
Office Action received for U.S. Appl. No. 12/844,892, mailed on Sep. 6, 2012, 33 pages.
Zhen Chen et al., "Application Level Network Access Control System Based on TNC Architecture for Enterprise Network," in: Wireless communications Networking and Information Security (WCNIS), 2010 IEEE International Conference, Jun. 25-27, 2010 (5 pages).

International Preliminary Report on Patentability, International Application No. PCT/US2012/026169, mailed Aug. 27, 2013, 8 pages
USPTO Oct. 2, 2013 Final Office Action from U.S. Appl. No. 13/275,196.
USPTO Oct. 4, 2013 Nonfinal Office Action from U.S. Appl. No. 12/844,892.
USPTO Oct. 25, 2013 Nonfinal Office Action from U.S. Appl. No. 12/844,964.
U.S. Appl. No. 14/045,208, filed Oct. 3, 2013, entitled "Execution Environment File Inventory," Inventors: Rishi Bhargava, et al.
PCT Application Serial No. PCT/US13/66690, filed Oct. 24, 2013, entitled "Agent Assisted Malicious Application Blocking in a Network Environment," 67 pages.
Patent Examination Report No. 1, Australian Application No. 2011283160, mailed Oct. 30, 2013.
USPTO Sep. 27, 2013, Notice of Allowance from U.S. Appl. No. 13/437,900.
PCT Application Serial No. PCT/US13/71327, filed Nov. 21, 2013, entitled "Herd Based Scan Avoidance System in a Network Environment," 46 pages.
"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).
Eli M. Dow, et al., "The Xen Hypervisor," Informit, dated Apr. 10, 2008, http://www.informit.com/articles/printerfriendly.aspx?p=1187966, printed Aug. 11, 2009 (13 pages).
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
Barrantes et al., "Randomized Instruction Set Emulation to Dispurt Binary Code Injection Attacks," Oct. 27-31, 2003, ACM, pp. 281-289.
Gaurav et al., "Countering Code-Injection Attacks with Instruction-Set Randomization," Oct. 27-31, 2003, ACM, pp. 272-280.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.
Tal Garfinkel, et al., "Terra: A Virtual Machine-Based Platform for Trusted Computing," XP-002340992, SOSP'03, Oct. 19-22, 2003, 14 pages.
IA-32 Intel® Architecture Software Developer's Manual, vol. 3B; Jun. 2006; pp. 13, 15, 22 and 145-146.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
Kurt Gutzmann, "Access Control and Session Management in the HTTP Environment," Jan./Feb. 2001, pp. 26-35, IEEE Internet Computing.

(56) References Cited

OTHER PUBLICATIONS

"Apache Hadoop Project," http://hadoop.apache.org/, retrieved and printed Jan. 26, 2011, 3 pages.

"Cbl, composite blocking list," http://cbl.abuseat.org, retrieved and printed Jan. 26, 2011, 8 pages.

A Tutorial on Clustering Algorithms, retrieved Sep. 10, 2010 from http://home.dei.polimi.it/matteucc/clustering/tutorial.html, 6 pages.

A. Pitsillidis, K. Levchenko, C. Kreibich, C. Kanich, G.M. Voelker, V. Pason, N. Weaver, and S. Savage, "Botnet Judo: Fighting Spam with Itself," in Proceedings of the 17th Annual Network and Distributed System Security Symposium (NDSS'10), Feb. 2010, 19 pages.

A. Ramachandran, N. Feamster, and D. Dagon, "Revealing botnet membership using DNSBL counter-intelligence," in Proceedings of the 2nd USENIX Steps to Reducing Unwanted Traffic on the Internet, 2006, 6 pages.

A. Ramachandran, N. Feamster, and S. Vempala, "Filtering Spam with Behavioral Blacklisting," in *Proceedings of ACM Conference on Computer Communications Security*, 2007, 10 pages.

B. Stone-Gross, M. Cova, L. Cavallor, B. Gilbert, M. Szydlowski, R. Kemmerer, C. Kruegel, and G. Vigna, "Your Botnet is My Botnet: Analysis of a Botnet Takeover," in Proceedings of the 16th Acm Conference on Computer and Communicatinos Security, 2009, 13 pages.

C. Kanich, C. Kreibich, K. Levchenko, B. Enright, G.M. Voelker, V. Paxson, and S. Savage, "Spamalytics: An Empirical Analysis of Spam Marketing Conversion," in Proceedings of the 15th ACM conference on Computer and Communications Security, 2008, 12 pages.

C.J. Burges, "A Tutorial on Support Vector Machines for Pattern Recognition," in *Journal of Data Mining and Knowledge Discovery*, 1998, 43 pages.

E-Mail Spamming Botnets: Signatures and Characteristics, Posted Sep. 22, 2008, http://www.protofilter.com/blog/email-spam-botnets-signatures.html, retrieved and printed Feb. 2, 2011, 4 pages.

G. Gu, J. Zhang, and W. Lee, "BotSniffer: Detecting Botnet Command and Control Channels in Network Traffic," in Proceedings of the 15th Annual Network and Distributed System Security Symposium (NDSS'08), Feb. 2008, 24 pages.

G. Gu, P. Porras, V. Yegneswaran, M. Fong, and W. Lee, "BotHunter: Detecting Malware Infection Through IDS-Driven Dialog Correlation," in Proceedings of the 16th USNIX Security Symposium, 2007, 34 pages.

G. Gu, R. Perdisci, J. Zhang, and W. Lee, "BotMiner: Clustering Analysis of Network Traffic for Protocol and Structure-Independent Botnet Detection," in Proceedings of the 17th USENIX Security Symposium, 2008, 15 pages.

I. Jolliffe, "Principal Component Analysis," in *Springer Series in Statistics, Statistical Theory and Methods, 2nd ed.*), 2002, 518 pages.

J. Dean and S. Ghemawat, "MapReduce: Simplified Data Processing on Large Clusters," in *Proceedings of Sixth Symposium on Operating System Design and Implementation, OSDI*, 2004, 13 pages.

J. Goebel and T. Holz, "Rishi: Identify Bot Contaminated Hosts by IRC Nickname Evaluation," in *Proceedings of the USENIX HotBots*, 2007, 12 pages.

J.B. Grizzard, V. Sharma, C. Nunnery, B.B. Kang, and D. Dagon, "Peer-to-Peer Botnets: Overview and Case Study," in Proceedings of the 1st Workshop on Hot Topics in Understanding Botnets, Apr. 2007, 14 pages.

J.P. John, A. Moshchuk, S.D. Gribble, and A. Krishnamurthy, "Studying Spamming Botnets Using Botlab," in *Proceedings of the 6th USENIX Symposium on Networked Systems Design and Implementation*, 2009, 16 pages.

K. Li, Z. Zhong, and L. Ramaswamy, "Privacy-Aware Collaborative Spam Filtering," in *Journal of IEEE Transactions on Parallel and Distributed Systems*, vol. 29, No. 5, May 2009, pp. 725-739.

L. Zhuang, J. Dunagan, D.R. Simon, H.J. Wang, and J.D. Tygar, "Characterizing botnets from email spam records," in Proceedings of the 1st Usenix Workshop on Large-Scale Exploits and Emergent Threats), 2008, 18 pages.

M. Frigo and S.G. Johnson, "The Design and Implementation of FFTW3," in Proceedings of the IEEE 93(2), Invited paper, Special Issue on Program Generation, Optimization, and Platform Adaptation, 2005, 16 pages.

R. Perdisci, I. Corona, D. Dagon, and W. Lee, "Detecting Malicious Flux Service Networks through Passive Analysis of Recursive DNS Traces," in Proceedings of the 25th Annual Computer Security Applications Conference (ACSAC 2009), Dec. 2009, 10 pages.

X. Jiang, D. Xu, and Y.-M. Wang, "Collapsar: A VM-Based Honeyfarm and Reverse Honeyfarm Architecture for Network Attack Capture and Detention," in Journal of Parallel and Distributed Computing, Special Issue on Security in Grid and Distributed Systems, 2006, 16 pages.

Y. Tang, S. Krasser, P. Judge, and Y.-Q. Zhang, "Fast and Effective Spam Sender Detection with Granular SVM on Highly Imbalanced Mail Server Behavior Data," in Proceedings of 2nd International Conference on Collaborative Computing: Networking, Applications and Worksharing (CollaborativeCom), Nov. 2006, 6 pages.

Y. Zhao, Y. Xie, F. Yu, Q. Ke, Y. Yu, Y. Chen, and E. Gillum, "BotGraph: Large Scale Spamming Botnet Detection," in Proceedings of the 6th USENIX Symposium on Networked Systems Design and Implementation, 2009, 26 pages.

Yinglian Xie, Fang Yu, Kannan Achan, Rina Panigraphy, Geoff Hulten, and Ivan Osipkov, "Spamming Botnets: Signatures and Characteristics," SIGCOMM '08, Aug. 17, 22, 2008, http://ccr.sigcomm.org/online/files/p171-xie.pdf, pp. 171-182.

Z. Li, A. Goya!, Y. Chen, and V. Paxson, "Automating Analysis of Large-Scale Botnet probing Events," in Proceedings of ACM Symposium on Information, Computer and Communications Security (ASIACCS)), 2009, 12 pages.

Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.

G. Pruett et al., "BladeCenter systems management software", [Online], Nov. 2005, pp. 963-975, [Retrieved from Internet on Oct. 24, 2012], <http://citeseerx.1st.psu.edu/viewdoc/download?doi=10.1.1.91.5091&rep=rep1&type=pdf>.

Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.

Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.

"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATIon/22000/PD22973/en_US/VSE%208.8%20-%20What's%20New.pdf, 4 pages.

"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.

Rivest, R., "The MD5 Message-Digest Algorithm", RFC 1321, Apr. 1992, retrieved on Dec. 14, 2012 from http://www.ietf.org/rfc/rfc1321.txt, 21 pages.

Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.

"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.

U.S. Appl. No. 13/728,705, filed Dec. 27, 2012, entitled "Herd Based Scan Avoidance System in a Network Environment," Inventors Venkata Ramanan, et al.

An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.

(56) References Cited

OTHER PUBLICATIONS

Bhatkar, et al., "Efficient Techniques for Comprehensive Protection from Memory Error Exploits," USENIX Association, 14th USENIX Security Symposium, Aug. 1-5, 2005, Baltimore, MD, 16 pages.

Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.

Shacham, et al., "On the Effectiveness of Address-Space Randomization," CCS'04, Oct. 25-29, 2004, Washington, D.C., Copyright 2004, 10 pages.

International Search Report and Written Opinion mailed Dec. 14, 2012 for International Application No. PCT/US2012/055674, 9 pages.

International Preliminary Report on Patentability and Written Opinion issued Jan. 29, 2013 for International Application No. PCT/US2011/020677 (9 pages).

Office Action received for U.S. Appl. No. 13/032,851, mailed on Dec. 4, 2013, 16 pages.

Notice of Allowance received for U.S. Appl. No. 13/275,196, mailed on Dec. 16, 2013, 10 pages.

Notice of Allowance received for U.S. Appl. No. 13/437,900, mailed on Jan. 13, 2014, 11 pages.

U.S. Appl. No. 14/127,395, entitled "Agent Assisted Malicious Application Blocking In A Network Environment," filed Dec. 18, 2013, Inventors: Chandan CP et al.

Patent Examination Report No. 1, Australian Application No. 2011283164, mailed Jan. 14, 2014.

USPTO Dec. 30, 2013 Final Office Action from U.S. Appl. No. 13/629,765.

* cited by examiner

```
struct hostInfoPdu {
    int         version;
    short       protocol;
    IPaddress   source_address;
    IPaddress   dest_address;       } 605
    short       source_port;
    short       dest_port;
    string      user;
    string      domain;
    string      sid;
    string      application_path;   } 610
    boolean     AV_enabled;
    boolean     FW_enabled;
    Interface   interfaces[];
};
```

FIG. 6

SYSTEM AND METHOD FOR REDIRECTED FIREWALL DISCOVERY IN A NETWORK ENVIRONMENT

TECHNICAL FIELD

This specification relates in general to the field of network security, and more particularly, to a system and method for redirected firewall discovery in a network environment.

BACKGROUND

The field of network security has become increasingly important in today's society. The Internet has enabled interconnection of different computer networks all over the world. However, the Internet has also presented many opportunities for malicious operators to exploit these networks. Certain types of malicious software (e.g., bots) can be configured to receive commands from a remote operator once the software has infected a host computer. The software can be instructed to perform any number of malicious actions, such as sending out spam or malicious emails from the host computer, stealing sensitive information from a business or individual associated with the host computer, propagating to other host computers, and/or assisting with distributed denial of service attacks. In addition, the malicious operator can sell or otherwise give access to other malicious operators, thereby escalating the exploitation of the host computers. Thus, the ability to effectively protect and maintain stable computers and systems continues to present significant challenges for component manufacturers, system designers, and network operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is an example packet data unit format that may be associated with exchanging metadata in example embodiments of the network environment.

DETAILED DESCRIPTION OF EXAMPLE EMBODIMENTS

Overview

A method is provided in one example embodiment that includes receiving metadata from a host over a metadata channel. The metadata may be correlated with a network flow and a network policy may be applied to the flow.

In other embodiments, a network flow may be received from a host without metadata associated with the flow, and a discovery redirect may be sent to the host. Metadata may then be received and correlated with the flow to identify a network policy action to apply to the flow.

Example Embodiments

Figure 1:
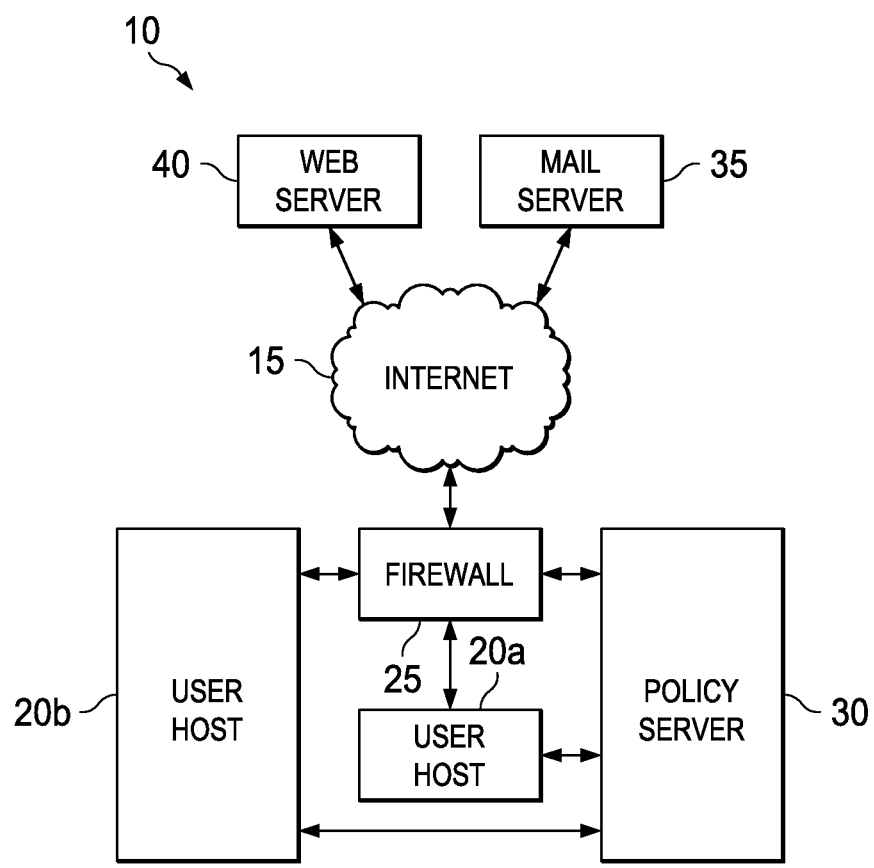
FIG. 1 is a simplified block diagram illustrating an example embodiment of a network environment in which a firewall may be discovered through host redirection according to this specification.

Turning to FIG. 1, FIG. 1 is a simplified block diagram of an example embodiment of a network environment 10 in which a firewall may be discovered through host redirection. In the embodiment illustrated in FIG. 1, network environment 10 can include Internet 15, user hosts 20a and 20b, a firewall 25, a policy server 30, a mail server 35, and a web server 40. In general, user hosts 20a-20b may be any type of termination node in a network connection, including but not limited to a desktop computer, a server, a laptop, a mobile telephone, or any other type of device that can receive or establish a connection with another node, such as mail server 35 or web server 40. Firewall 25 may control communications between user hosts 20a-20b and other nodes attached to Internet 15 or another network, such as by blocking unauthorized access while permitting authorized communications. In some instances, firewall 25 may be coupled to or integrated with an intrusion prevention system, network access control device, web gateway, email gateway, or any other type of gateway between Internet 15 and user hosts 20a-20b. Moreover, the location of firewall 25 in the routing topology close to user hosts 20a-20b is arbitrary. Policy server 30 may be coupled to or integrated with firewall 25, and may be used to manage user hosts 20a-20b and to administer and distribute network policies. Thus, in this example embodiment, user hosts 20a-20b may communicate with servers attached to Internet 15, such as mail server 35 or web server 40, by establishing a connection through firewall 25 if permitted by policies implemented in firewall 25 and managed by policy server 30.

Each of the elements of FIG. 1 may couple to one another through simple interfaces or through any other suitable connection (wired or wireless), which provides a viable pathway for network communications. Additionally, any one or more of these elements may be combined or removed from the architecture based on particular configuration needs. Network environment 10 may include a configuration capable of transmission control protocol/Internet protocol (TCP/IP) communications for the transmission or reception of packets in a network. Network environment 10 may also operate in conjunction with a user datagram protocol/IP (UDP/IP) or any other suitable protocol where appropriate and based on particular needs.

For purposes of illustrating the techniques for providing network security in example embodiments, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments used in organizations and by individuals include the ability to communicate electronically with other networks using the Internet, for example, to access web pages hosted on servers connected to the Internet, to send or receive electronic mail (i.e., email) messages, or to exchange files. However, malicious users continue to develop new tactics for using the Internet to spread malware and to gain access to confidential information. Malware generally includes any software designed to access and/or control a computer without the informed consent of the computer owner, and is most commonly used as a label for any hostile, intrusive, or annoying software such as a computer virus, bot, spyware, adware, etc. Once compromised, malware may subvert a host and use it for malicious activity, such as spamming or information theft. Malware also typically includes one or more propagation vectors that enable it to spread within an organization's network or across other networks to other organizations or individuals. Common propagation vectors include exploiting known vulnerabilities on hosts within the local network and sending emails having a malicious program attached or providing malicious links within the emails.

One way in which malware may operate is to deceive a user by using a different network protocol exchange than the user expects. The malware may be packaged so as to convince the user to allow access to run it in some innocuous way, thus allowing it access to the network, which often may require passing through a firewall or other security measure. The malware may then exploit the access to engage in alternative or additional activities not contemplated by the user. For example, a game may send email messages or a word processor may open a web connection. At the same time, the malware may also use standard protocols to deceive the firewall into permitting the malware to establish remote connections.

Botnets, for example, use malware and are an increasing threat to computer security. In many cases they employ sophisticated attack schemes that include a combination of well-known and new vulnerabilities. Botnets generally use a client-server architecture where a type of malicious software (i.e., a bot) is placed on a host computer and communicates with a command and control (C&C) server, which may be controlled by a malicious user (e.g., a botnet operator). Usually, a botnet is composed of a large number of bots that are controlled by the operator using a C&C protocol through various channels, including Internet Relay Chat (IRC) and peer-to-peer (P2P) communication. The bot may receive commands from the C&C server to perform particular malicious activities and, accordingly, may execute such commands. The bot may also send any results or pilfered information back to the C&C server.

A bot is often designed to initiate communication with the C&C server and to masquerade as normal web browser traffic. For example, a bot may use a port typically used to communicate with a web server. Such bots, therefore, may not be detected by existing technologies without performing more detailed packet inspection of the web traffic. Moreover, once a bot is discovered, the botnet operator may simply find another way to masquerade network traffic by the bot to continue to present as normal web traffic. More recently, botnet operators have crafted bots to use encryption protocols such as, for example, secure socket layer (SSL), thereby encrypting malicious network traffic. Such encrypted traffic may use a Hypertext Transfer Protocol Secure (HTTPS) port so that only the endpoints involved in the encrypted session can decrypt the data. Thus, existing firewalls and other network intrusion prevention technologies may be unable to perform any meaningful inspection of the web traffic, and bots may continue to infect host computers within networks.

Other software security technology focused on preventing unauthorized program files from executing on a host computer may have undesirable side effects for end users or employees of a business or other organizational entity. Network or Information Technology (IT) administrators may be charged with crafting extensive policies relevant to all facets of the business entity to enable employees to obtain software and other electronic data from desirable and trusted network resources. Without extensive policies in place, employees may be prevented from downloading software and other electronic data from network resources that are not specifically authorized, even if such software and other data facilitate legitimate and necessary business activities. Such systems may be so restrictive that if unauthorized software is found on a host computer, any host computer activities may be suspended pending network administrator intervention. Moreover, at the network level there may simply be too many applications to effectively track and incorporate into policies. Large whitelists or blacklists can be difficult to maintain and may degrade network performance, and some applications may not be susceptible to easy identification.

Information may be shared between a host and a firewall to collectively and mutually achieve better security, though. For example, a host may understand an application as an executable file that is running a process with specific authentication, while the firewall may understand the application as a protocol in a TCP connection, which may also be correlated to a particular user authentication. The host may share session descriptors and other metadata with the firewall, and the firewall may share network policy with the host as needed to correlate application activities with expected network behavior. Network policy may include elements of security policy as well as other network specific parameters, such as quality of service (QoS) and routing. A host may also be associated with a universally unique identifier (UUID), which can be used to correlate connections and activities originating behind network address translators.

A host may also notify the firewall of additional network connections to the host. If a host has both wireless and wired connections active simultaneously, for example, there may be a risk of data received on one connection being transmitted on the other, so it may be desirable to restrict access to sensitive data. A host may also notify the firewall if the connection is associated with a virtual machine, or if the host has mountable read/write media, such as a USB stick attached.

In some embodiments of network environment 10, a host may include multiple attachment points, causing it to have multiple IP addresses. In other embodiments, a host may use the IP version 6 (IPv6), perhaps including Privacy Extensions (RFC4941), causing it to have one or more registered and known IPv6 addresses and one or more hidden or private IPv6 addresses. In these embodiments, an interlocked firewall may readily use dynamic information sharing to discover the user-to-host mapping for all the addresses on a host.

This dynamic information sharing between an interlocked host and firewall in network environment 10 may provide several benefits over conventional architectures. For example, by coordinating firewall policy with a host, a firewall can manage routes differently, such as by allowing or denying traffic depending on which of multiple users on a host may be attempting to establish a connection. Moreover, only applications that may need to be granularly controlled need to be controlled by the firewall. Thus, the firewall may control arbitrary or evasive applications, provide higher effective throughput, and control mobile-user traffic. In addition, traffic that does not need to be completely allowed or denied can be rate-limited. Arbitrary or evasive applications can also be rate-limited with process information available on a firewall, and differentiated services can be provided for managed and unmanaged hosts.

Many hosts may only use a single firewall for all routes. An agent running on a host may maintain a firewall cache that can identify this firewall. In a more complex scenario, a host may use more than one firewall, in which case it is important that the host understand which firewall will process a given flow. The firewall cache can provide routes through more than one firewall by mapping a given network route to a particular firewall. Routes are generally managed or unmanaged. A "managed route" generally refers to a route through a firewall that may be configured to accept metadata for network flows, while an "unmanaged route" is a route through a firewall that may not accept metadata. A firewall cache may associate a network (e.g., identified by a network destination and network mask) with a firewall designated for managing flows to the network, for example, or may associate an unmanaged route to a null value. The firewall cache may be initialized or configured by an administrator, providing separate configurations for each named network and/or default configurations for the first time a network is used. Some configurations may define one firewall for Internet addresses, initially based on an assumption that all global IP addresses are on the Internet.

Session descriptors generally include information about a host and an application associated with a given network session. For example, a session descriptor may include a UUID associated with the host and the user credentials of a process owner. Since a user can run separate processes with different user credentials, such information may be particularly advantageous for Citrix and terminal services. A session descriptor may additionally include a filename, pathname or other unique identifier of an application file (e.g., C:\ . . . \WINWORD.EXE) that is running the process attempting to establish a network connection. For example, in some embodiments the application may be identified by a hash function of the application's executable file, so as to make it more difficult for a malicious user to spoof the application name. A firewall may correlate this information with an application identifier or protocol to ensure that the application is performing as expected. A session descriptor may also contain information about the host environment, such as software installed on the host and the current configuration and state of the software, permitting the firewall to act as a network access control device. For example, a session descriptor may indicate whether the local anti-virus system is up to date and running. If Host-based Data Loss Prevention (HDLP) software is available, a session descriptor may also include file-typing information for file transfer. HDLP normally determines the type of file being transmitted out of the network (e.g., PDF, Word, etc.). The firewall may have additional policies about certain file types being transmitted over particular protocols, which may not be visible directly to an HDLP program.

Session descriptors and other metadata may be exchanged over an out-of-band communication channel (a "metadata channel") in some embodiments of network environment 10, which may be implemented with a protocol that provides authentication and/or encryption for communication privacy. In more particular embodiments, a Datagram Transport Layer Security (DTLS) protocol may be used to provide a metadata channel with communication privacy, and a host and a firewall may use certificates based on a common certificate authority. A policy server may distribute certificates to a host and firewall in some embodiments, while an external certificate authority may be used in other embodiments. Some protocols, including DTLS, may also be used to establish a back channel from a firewall to a host, which may be used for error messages and diagnostics, for example.

A host can send metadata to a firewall before opening a new network flow such that, in general, metadata arrives at the firewall before the first packet of a new flow. More particularly, a firewall agent on the host may intercept the first packet of a new flow and send a session descriptor and other metadata associated with the flow, such as source IP address and port, destination IP address and port, and protocol. The firewall may maintain a metadata cache and correlate a network flow with metadata if the firewall agent releases the flow. More particularly, the firewall may correlate metadata with network flow data, which broadly refers to information that associates a given network flow with a source node (i.e., a node sending or attempting to send a packet) and a destination node (i.e., a node to which a packet is addressed) or destination nodes (e.g., broadcast or multicast address). Flow data may also include other information about the flow, such as a protocol family or protocol, for example.

For example, TCP generally opens a new flow (generally referred to as a "connection" in the context of a TCP flow) with a handshake—a host sends a first packet with one of the TCP flag bits (i.e., the SYN bit) set to indicate that a three-way handshake is in progress. Thus, an agent on a source node may intercept a new TCP connection by detecting an application on the source node sending a SYN packet (i.e., a packet with the SYN bit set) and holding the SYN packet. The agent may be able to identify a firewall for managing the route to a destination node associated with the new connection, such as by locating the route and its associated firewall in a firewall cache, and send metadata to the firewall (which the firewall can cache) over a secure metadata channel. The connection request may then be released by sending the SYN packet to the firewall, and the firewall may correlate the source IP, destination IP, protocol, etc.

Flows are not limited to communications using a reliable protocol such as TCP; a flow may also include communications using an unreliable protocol such as UDP or IP. In other embodiments, an agent may track flows that use an unreliable protocol and intercept a new flow by holding the first packet of a flow while it transmits metadata. The agent may also be able to retransmit the metadata by caching a hash of the first packet of a flow and comparing the hash to the hash of subsequent packets to determine if the first packet is being retransmitted by an application. In yet other embodiments, a firewall may track flows and cache the first packet until metadata arrives. In still yet other embodiments, metadata may be sent with every packet in a flow using an unreliable protocol, or never sent. Caches of first packet data can be very short-lived (e.g. less than one second to five seconds).

However, a host may not always be able to identify or locate such a firewall. For example, a host may move from one network to another (e.g., a laptop moving from a home network to a corporate network), may have a misconfigured routing table, a stale table entry, or a missing table entry, which may cause the host to send metadata to the incorrect firewall (or send no metadata at all). If a host cannot determine the location of a firewall, an additional mechanism is needed.

In accordance with embodiments disclosed herein, network environment 10 may provide a system and method for redirection-based discovery of an interlocked firewall. A firewall can maintain a list of managed hosts, which may be identified within a given subnet range or identified explicitly by IP address or hostname, for example. In some embodiments, a policy server may provide the list to a firewall. The firewall may cache or drop the initial connection packet (e.g., a SYN packet) and send a firewall-host discovery redirect to any managed host that attempts to open a connection without sending appropriate metadata. In more particular embodiments, network environment 10 can decrease redirect traffic volume by not sending discovery redirects for local link or local broadcasts (e.g., netbios probes on port 137).

Managed hosts and firewalls may also maintain a shared secret (e.g., a password, key, etc.) for authentication of redirect packets. The shared secret may be distributed by a policy server or manually configured, for example, and a firewall may share the same secret with more than one host, including all hosts within a site. In certain embodiments, the shared secret may be a function of time. In yet other embodiments, managed hosts and firewalls may use asymmetric key cryptography (i.e., public key cryptography) to secure redirect packets.

In more particular embodiments, a discovery redirect may be implemented in an Internet Control Message Protocol (ICMP) packet, such as an ICMP Destination Unreachable (DU) packet for administratively prohibited communications (i.e., ICMP type 3, code 13). An ICMP DU packet may include the IP header and TCP (or UDP) headers of the original packet, and may further include a magic number and a hash-based message authentication code (HMAC). In such an embodiment, the magic number may be a 32-bit identifier (e.g., 0x46484131 or "FHA1"), which may also act as a protocol version number. In general, an HMAC is a message authentication code (MAC) involving a cryptographic hash function in combination with a shared secret (e.g., a secret key). A MAC (and an HMAC) may be used to simultaneously verify both the data integrity and the authenticity of a message. An HMAC may include, for example, the host-firewall shared secret, source IP address, destination IP address, IP identification, firewall IP address, and TCP initial sequence number.

In other embodiments, a firewall may have a public/private key pair that it can use to establish a metadata channel (e.g., a DTLS connection). The firewall's private key may be used to encrypt a hash of the discovery redirect packet (using RSA for example). The encrypted hash can be inserted into the discovery redirect, and a host can validate the discovery redirect by decrypting the hash using the firewall's public key. For example, an ICMP DU packet may be used as described above, but replacing the HMAC with the encrypted hash.

While a host may ignore most of these types of ICMP DU packets, the host can take appropriate action when it receives a discovery redirect packet with an HMAC or encrypted hash. For example, a host may calculate an HMAC using its shared key and authenticate the message by comparing the calculated HMAC to the HMAC received in the discovery redirect packet. If the message is authentic, a host may update its firewall cache to reflect the firewall information in the discovery redirect packet and send metadata to the firewall for the given connection.

Figure 2:
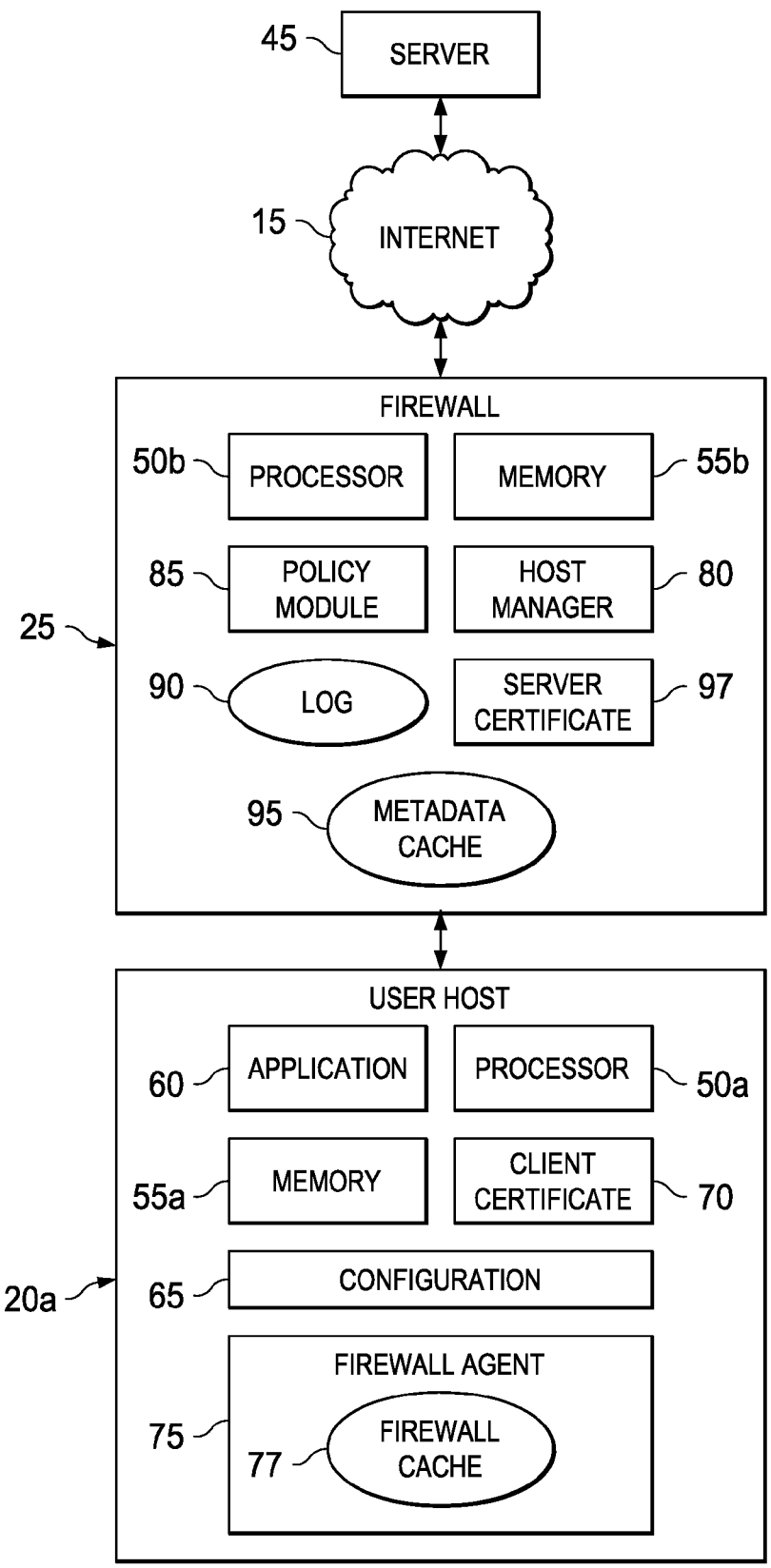
FIG. 2 is simplified block diagram illustrating additional details that may be associated with one potential embodiment of the network environment.

Turning to FIG. 2, FIG. 2 is a simplified block diagram illustrating additional details that may be associated with potential embodiments of network environment 10. FIG. 2 includes Internet 15, user host 20a, firewall 25, and a server 45. Each of user host 20a and firewall 25 may include a respective processor 50a-50b, a respective memory element 55a-55b, and various hardware and/or software modules. More particularly, user host 20a may include an application 60, a configuration database 65, a client certificate 70, and a firewall agent 75, which may maintain a firewall cache 77. Firewall 25 may include a host manager 80 and a policy module 85, as well as a log 90, a metadata cache 95, and a server certificate 97.

In one example implementation, user hosts 20a-20b, firewall 25, and/or policy server 30 are network elements, which are meant to encompass network appliances, servers, routers, switches, gateways, bridges, loadbalancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. However, user hosts 20a-20b may be distinguished from other network elements, as they tend to serve as a terminal point for a network connection, in contrast to a gateway or router that tends to serve as an intermediate point in a network connection. User hosts 20a-20b may also be representative of wireless network nodes, such as an i-Phone, i-Pad, Android phone, or other similar telecommunications devices.

In regards to the internal structure associated with network environment 10, each of user hosts 20a-20b, firewall 25, and/or policy server 30 can include memory elements for storing information to be used in the operations outlined herein. Each of user hosts 20a-20b, firewall 25, and/or policy server 30 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory items discussed herein (e.g., memory elements 55a-55b) should be construed as being encompassed within the broad term 'memory element.' The information being used, tracked, sent, or received by user hosts 20a-20b, firewall 25, and/or policy server 30 could be provided in any database, register, queue, table, cache, control list, or other storage structure, all of which can be referenced at any suitable timeframe. Any such storage options may be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements (as shown in FIG. 2) can store data used for the operations described herein. This includes the memory elements being able to store software, logic, code, or processor instructions that are executed to carry out the activities described herein.

In one example implementation, user hosts 20a-20b, firewall 25, and/or policy server 30 may include software modules (e.g., firewall agent 75 and/or host manager 80) to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of user hosts 20a-20b, firewall 25, and/or policy server 30 may include a processor that can execute software or an algorithm to perform activities as discussed herein. A processor can execute any type of instructions associated with the data to achieve the operations detailed herein. In one example, the processors (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 3:
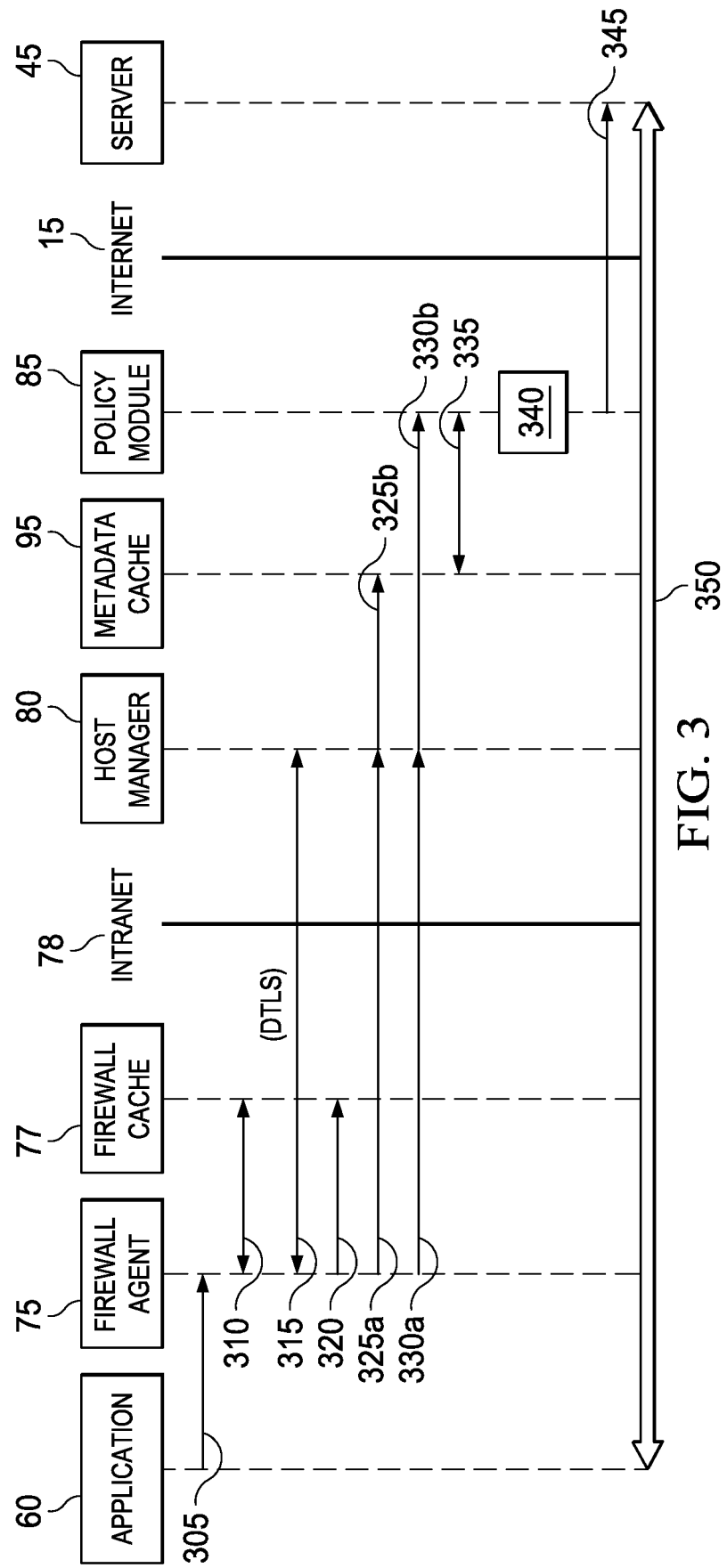
FIG. 3 is a simplified interaction diagram illustrating potential operations that may be associated with example embodiments of the network environment.

FIG. 3 is a simplified interaction diagram illustrating potential operations that may be associated with example embodiments of network environment 10 with a firewall cache that identifies a firewall for a managed route. FIG. 3 includes application 60, firewall agent 75, and firewall cache 77, which may be installed in a user host, such as user host 20a, for example. FIG. 3 also illustrates host manager 80, metadata cache 95, and policy module 85, which may be installed in a firewall such as firewall 25, for example. An intranet 78, Internet 15, and server 45 are also depicted in FIG. 3.

An application such as application 60 may attempt to open a new TCP connection at 305, with a server such as server 45, for example. Firewall agent 75 may intercept and hold the new connection, consulting firewall cache 77 (which may be initialized from configuration) at 310 to identify a firewall associated with the route to server 45. In the particular example of FIG. 3, a firewall associated with host manager 80 (e.g., firewall 25) may be identified and a connection (e.g., a DTLS connection) to the firewall may be opened at 315, using a certificate (e.g., client certificate 70) distributed by a policy server, for example. The connection may also be added to firewall cache 77 at 320 for future connections. Firewall agent 75 may send metadata for the connection to host manager 80 at 325a via a DTLS packet, for example. Host manager 80 may store the metadata in metadata cache 95 at 325b. Firewall agent 75 may release the connection at 330a, allowing data from application 60 to flow to host manager 80. Host manager 80 may provide connection data (i.e., TCP flow data, such as source IP address/port, destination IP address/port, protocol, etc.) to policy module 85 at 330b, and policy module 85 may correlate the connection data with metadata from metadata cache 95 at 335 to apply appropriate network policy at 340. In the example of FIG. 3, network policy permits the connection, so the connection may be released to server 45 at 345 and data may flow between server 45 and application 60 at 350.

Figure 4:
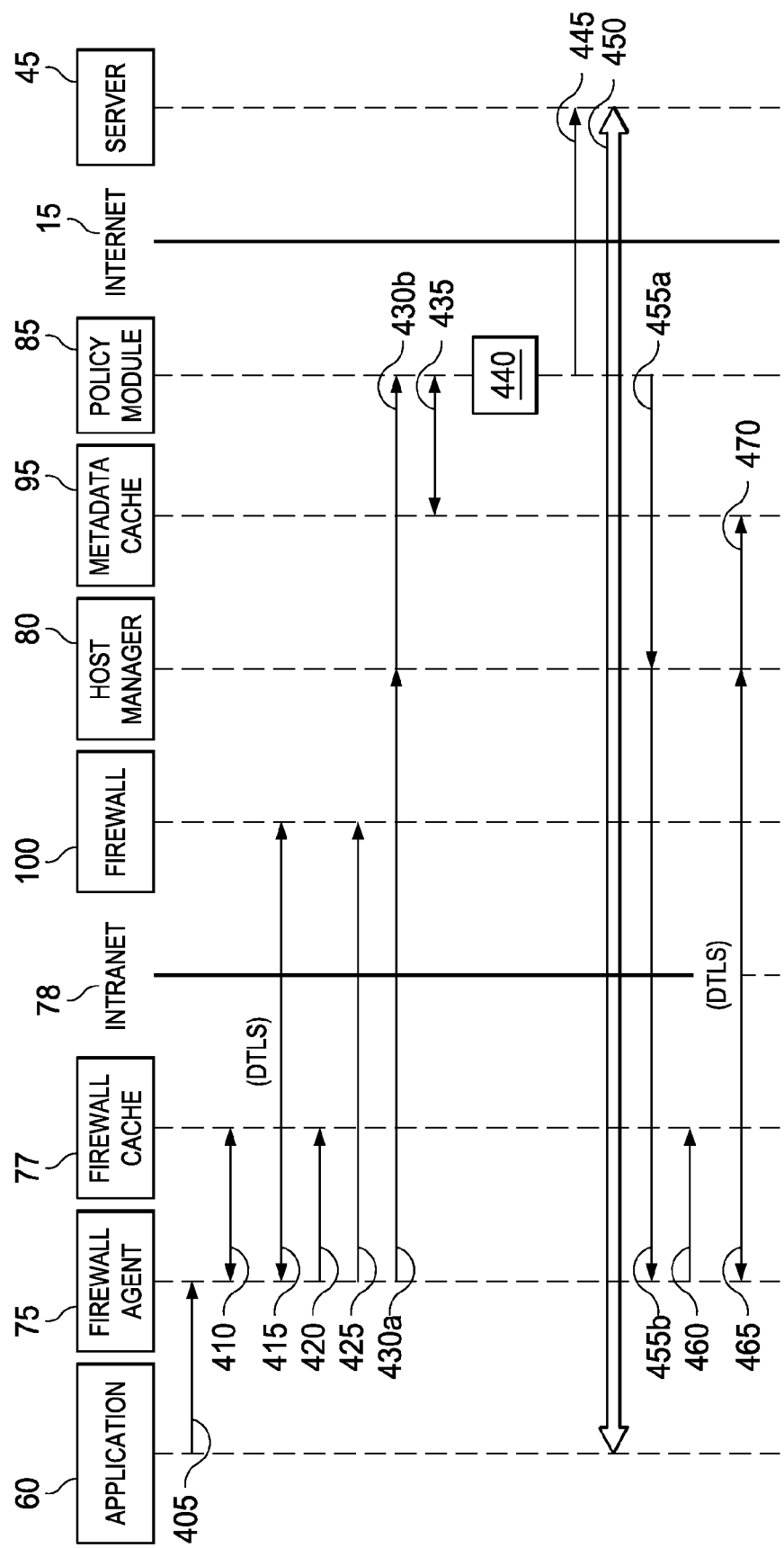
FIG. 4 is a simplified interaction diagram illustrating potential operations that may be associated with example embodiments of the network environment with a stale firewall cache that identifies an invalid firewall for a managed route.

FIG. 4 is a simplified interaction diagram illustrating potential operations that may be associated with example embodiments of network environment 10 with a stale firewall cache that identifies an invalid firewall for a managed route. FIG. 4 includes application 60, firewall agent 75, and firewall cache 77, which may be installed in a user host, such as user host 20a, for example. FIG. 4 also illustrates host manager 80, metadata cache 95, and policy module 85, which may be installed in a firewall such as firewall 25, for example. An intranet 78, Internet 15, server 45, and an invalid firewall 100 are also depicted in FIG. 4.

An application such as application 60 may attempt to open a new flow at 405, with a server such as server 45, for example. Firewall agent 75 may intercept and hold the new flow, and consult firewall cache 77 (which may be initialized from configuration) at 410 to identify a firewall associated with the route to server 45. In the particular example of FIG. 4, firewall cache 77 may include a stale entry that identifies firewall 100 for the route to server 45, such as might occur if a laptop or other mobile device moves from one network to another. Thus, firewall agent 75 may open, attempt to open, or believe it has previously opened a connection (e.g., a DTLS connection) to firewall 100 at 415, using a certificate distributed by a policy server, for example. The DTLS connection to firewall 100 may also be added to firewall cache 77 at 420 for future connections. Firewall agent 75 may fail to open a DTLS connection at 415, or it may send metadata for the connection to firewall 100 via a DTLS packet at 425 if it believes a connection is already open. Firewall 100 may never receive the metadata since it may no longer even be accessible to firewall agent 75 (e.g., there is no route to firewall 100), in which case the metadata is lost in transmission. If firewall 100 receives the metadata, it may be added to a metadata cache associated with firewall 100, but may be ignored since firewall 100 is no longer responsible for managing the route to server 45 in this particular example. Firewall agent 75 may release the new flow and data from application 60 may flow to host manager 80 at 430a. Host manager 80 may provide flow data to policy module 85 at 430b, and policy module 85 may attempt to correlate the flow data with metadata from metadata cache 95 at 435 to apply appropriate network policy at 440. However, since metadata for the flow was sent to another firewall (e.g., firewall 100) in this example scenario, policy module 85 may be unable to retrieve the metadata for the flow at 435. In the example of FIG. 4, though, network policy may permit the flow without metadata, so the flow may be released to server 45 at 445 and data may flow between server 45 and application 60 at 450.

Policy module 85 may log the event (i.e., releasing a new flow without metadata) and notify host manager 80 at 455a. Host manager 80 may send a discovery redirect to firewall agent 75 at 455b, which may include an HMAC based on a shared secret. Firewall agent 75 can receive the discovery redirect, and may also authenticate the discovery redirect based on the HMAC, for example, and update firewall cache 77 accordingly at 460. Firewall agent 75 may also open a connection (e.g., a DTLS connection) to host manager 80 and send metadata at 465. Host manager 80 may store in the metadata in metadata cache 95 at 470. The metadata can be audited along with the flow, which is already passing through the firewall associated with host manager 80.

Figure 5:
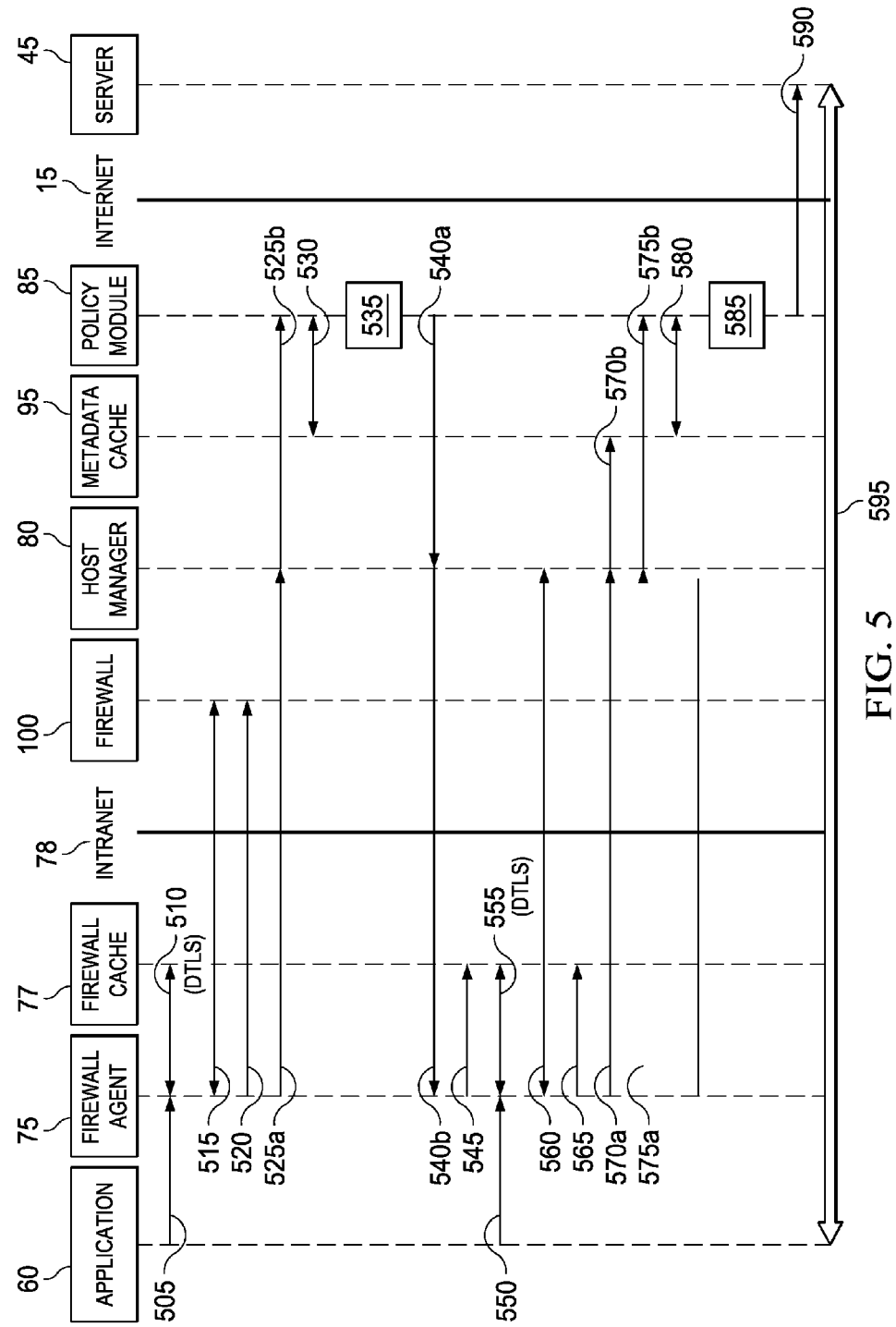
FIG. 5 is a simplified interaction diagram illustrating potential operations that may be associated with other example embodiments of the network environment with a stale firewall cache that identifies an invalid firewall for a managed route.

FIG. 5 is a simplified interaction diagram illustrating potential operations that may be associated with other example embodiments of network environment 10 with a stale firewall cache that identifies an invalid firewall for a managed route. FIG. 5 includes application 60, firewall agent 75, and firewall cache 77, which may be installed in a user host, such as user host 20a, for example. FIG. 5 also illustrates host manager 80, metadata cache 95, and policy module 85, which may be installed in a firewall such as firewall 25, for example. An intranet 78, Internet 15, server 45, and invalid firewall 100 are also depicted in FIG. 5.

An application such as application 60 may attempt to open a new TCP connection at 505, with a server such as server 45, for example. Firewall agent 75 may intercept and hold the new connection, and consult firewall cache 77 at 510 to identify a firewall associated with the route to server 45. In the particular example of FIG. 5, firewall cache 77 may include a stale entry that identifies firewall 100 for the route to server 45, such as might occur if a laptop or other mobile device moves from one network to another. Firewall cache 77 may also identify an open connection 515 to firewall 100 in this scenario. Thus, firewall agent 75 may send metadata for the connection to firewall 100 via a DTLS packet at 520, but since firewall 100 is no longer responsible for managing the route to server 45 in this particular example, this metadata may be generally ignored by firewall 100. Firewall agent 75 may release the connection and data from application 60 may flow to host manager 80 at 525a. Host manager 80 may provide connection data to policy module 85 at 525b, and policy module 85 may attempt to correlate the connection data with metadata from metadata cache 95 at 530 to apply appropriate network policy at 535. However, since metadata for the connection was sent to another firewall (e.g., firewall 100) in this example scenario, policy module 85 may be unable to retrieve the metadata for the connection at 530. In the example of FIG. 5, network policy may block the connection without metadata at 535, so the firewall (e.g., host manager 80 or policy module 85) may drop the initial connection packet, without attempting to reset the connection (e.g., by sending a TCP RST packet).

Policy module 85 may log the event (i.e., dropping the initial connection packet because no metadata was received) and notify host manager 80 at 540a. Host manager 80 may send a discovery redirect to firewall agent 75 at 540b. Firewall agent 75 can receive the discovery redirect, and may also authenticate the discovery redirect based on an HMAC, for example, and update firewall cache 77 accordingly at 545. In the general case, application 60 retransmits its connection request at 550 if the firewall drops the initial connection packet (without resetting the connection) and application 60 does not receive an acknowledgement (e.g., an ACK packet) from server 45. Firewall agent 75 may again intercept and hold the connection, and consult firewall cache 77 at 555 to identify a firewall associated with the route to server 45. Updated firewall cache 77 may then identify a firewall associated with host manager 80 (e.g., firewall 25). Firewall agent 75 may also open a connection (e.g., a DTLS connection) to host manager 80 at 560 and add the new connection to firewall cache 77 at 565 for future connections. Firewall 75 may send metadata at 570a, which host manager 80 may store in metadata cache 95 at 570b.

Firewall agent 75 may release the connection at 575a, allowing data from application 60 to flow to host manager 80. Host manager 80 may send connection data to policy module 85 at 575b, and policy module 85 may correlate the connection data with metadata from metadata cache 95 at 580 to apply appropriate network policy at 585. In the example of FIG. 5, network policy permits the connection, so the connection may be released to server 45 at 590 and data may flow between server 45 and application 60 at 595.

In another embodiment, host manager 80 may cache the initial connection packet for a brief period, enabling a connection to proceed when metadata is received at 570b without waiting for application 60 to retransmit the initial connection packet, which can make traffic flow faster. In yet another embodiment, firewall agent 75 can cache the initial connection packet and retransmit it when it receives a discovery redirect.

In various other scenarios, a firewall agent may have no information on a firewall (not even configuration information). In some embodiments, the firewall agent may allow a new flow through to a firewall without sending metadata. If the firewall receives the new flow without metadata, the flow may be processed substantially similarly to receiving a flow from a firewall agent having a stale firewall cache entry, such as described above with reference to FIG. 4 and FIG. 5. In such a scenario, the firewall agent incurs no overhead for flows over unmanaged routes.

A host agent may also send a PING message to a preconfigured address to force discovery for a particular path, such as by sending a PING message to a public Internet address to force discovery for the Internet path. A host agent may also send such a PING message on initial connection to a new network device.

As illustrated in various example embodiments above, a firewall cache may be updated in response to a discovery redirect, such as at 460 and 545. In more particular embodiments, a firewall agent may update its firewall cache by adding the subnet associated with the redirect message (e.g., a /24 entry for IPv4, /64 for IPv6). Alternatively, a firewall agent may search the firewall cache for the longest prefix matching the target address and add a new entry associating the firewall/port identified in the discovery redirect with the target address masked by eight bits (i.e., target/8=firewall:port) for IPv4 or by sixteen bits (i.e., target/16=firewall:port) for IPv6.

If a matching entry is found in the firewall cache, the firewall agent may compare the entry to the firewall/port identified in the discovery redirect. If the firewall/port from the discovery redirect does not match the firewall/port in the applicable firewall cache entry, the firewall cache may be updated by adding a new entry for the discovery target with a mask length incrementally modified (i.e., splitting the entry by incrementally increasing or decreasing the granularity of the entry for the discovery target) over the matching entry.

For example, the mask length of an entry may be increased by eight bits and the resulting network identifier associated with the discovery target. If the entry cannot be split further (i.e., the mask length is already 32 bits for an IPv4 address), the entry may be replaced such that the entry associates the discovery target with the firewall/port in the discovery redirect (i.e., replace the entry with target/32=redirect firewall:port).

In another example, a firewall cache entry may be split by adding a more specific entry (e.g., /24 for IPv4 or /64 for IPv6) and then generalized if overlapping discovery redirects are received. A firewall's routing knowledge may also be used to determine granularity or subnets associated with an exempt zone may be conveyed to a firewall agent in some embodiments.

Network environment 10 may also operate seamlessly with unmanaged routes. For example, a firewall agent may intercept a new connection from an application to a server and determine from a firewall cache that the route is unmanaged. The firewall agent may release the connection and the connection with the server may be established with no additional packet overhead.

FIG. 6 is an example packet data unit (PDU) format 600 that may be associated with exchanging metadata over a metadata channel in example embodiments of network environment 10. PDU format 600 may include, for example, network flow data 605 and session descriptor data 610. Network flow data 605 may provide information associated with a new flow from a source, such as an application on a managed host. In PDU format 600, for instance, network flow data 605 may identify a protocol (short protocol) (e.g., TCP, UDP, ICMP, GRE, IPSec, etc.), the IP address of the source node (IPaddress source_address), the port number of the process opening the connection (short source_port), the IP address of the destination node (IPaddress dest_address), and the port number of the process receiving the connection on the destination node (short dest_port). Session descriptor 610 may provide information about a user associated with the application opening the connection, such as a secure ID (string sid), a domain associated with the user (string domain), and a user name (string user), as well as information about the application, such as the full path of the application (string application_path). Other information in session descriptor 610 may provide data about the state of the source node (e.g., a host), including the state of a host firewall (boolean FW_enabled) and antivirus software running on the host (boolean AV_enabled), and information about interfaces on the source node (Interface interfaces[ ]). PDU format 600 is merely illustrative, though, and may be readily adapted to provide alternative or additional metadata, such as information about an intrusion prevention system, routing information, additional vendor information, etc.

Network environment 10 may provide significant advantages, some of which have already been discussed. For example, network environment 10 can provide security of host/firewall interlock data with low protocol overhead. Network environment 10 may be readily adapted to reuse standard code packages, leveraging configuration data, protocols such as DTLS, and timers in TCP and application layer protocols.

In the examples provided above, as well as numerous other potential examples, interaction may be described in terms of two, three, or four network elements. However, the number of network elements has been limited for purposes of clarity and example only. In certain cases, it may be easier to describe one or more of the functionalities of a given set of operations by only referencing a limited number of network elements. It should be appreciated that network environment 10 is readily scalable and can accommodate a large number of components, as well as more complicated/sophisticated arrangements and configurations. Accordingly, the examples provided should not limit the scope or inhibit the broad teachings of network environment 10 as potentially applied to a myriad of other architectures. Additionally, although described with reference to particular scenarios, where a particular module, such as policy module 85, is provided within a network element, these modules can be provided externally, or consolidated and/or combined in any suitable fashion. In certain instances, such modules may be provided in a single proprietary unit.

It is also important to note that the steps in the appended diagrams illustrate only some of the possible scenarios and patterns that may be executed by, or within, network environment 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network environment 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A computer-readable non-transitory medium comprising one or more instructions that when executed on a processor configure the processor to perform one or more operations for redirected firewall discovery, the one or more operations comprising:
   intercepting, at a first firewall in a network environment, a network flow from a source node;
   when the first firewall does not have metadata associated with the network flow in a metadata cache of the first firewall or the first firewall is unable to retrieve the metadata associated with the network flow, sending a discovery redirect from a host manager to cause a firewall cache at the source node to include a second firewall;
   receiving the metadata associated with the network flow at the second firewall; and
   correlating, at the second firewall, the metadata with the network flow to apply a network policy at the second firewall to the network flow.

2. The computer-readable non-transitory medium of claim 1, wherein the discovery redirect is an Internet Control Message Protocol packet.

3. The computer-readable non-transitory medium of claim 1, wherein the discovery redirect is an Internet Control Message Protocol Destination Unreachable packet.

4. The computer-readable non-transitory medium of claim 1, wherein the discovery redirect is an Internet Control Message Protocol Destination Unreachable packet for administratively prohibited communications.

5. The computer-readable non-transitory medium of claim 1, wherein the discovery redirect comprises a hash-based message authentication code.

6. The computer-readable non-transitory medium of claim 1, wherein the discovery redirect comprises a hash-based message authentication code with a shared secret.

7. The computer-readable non-transitory medium of claim 1, wherein the discovery redirect comprises a private key encryption of a hash of the discovery redirect.

8. The computer-readable non-transitory medium of claim 1, wherein the metadata is received on a metadata channel.

9. The computer-readable non-transitory medium of claim 1, wherein the metadata is received using a Datagram Transport Layer Security protocol.

10. The computer-readable non-transitory medium of claim 1, further comprising caching a first packet in the network flow.

11. A computer-readable non-transitory medium comprising one or more instructions that when executed on a processor configure the processor to perform one or more operations, the one or more operations, comprising:
    intercepting a network flow from a source node to a destination node at a firewall agent of the source node;
    holding a first packet of the network flow at the firewall agent of the source node;
    identifying, in a firewall cache by the firewall agent, a firewall for managing a route to the destination node;
    opening a metadata connection with the firewall;
    sending metadata associated with the network flow from the firewall agent to the firewall over the metadata connection while holding the first packet of the network flow; and releasing the network flow by sending the first packet of the network flow from the firewall agent to the firewall.

12. The computer-readable non-transitory medium of claim 11, wherein the network flow uses a Transmission Control Protocol and intercepting the network flow comprises detecting a SYN packet from the source node.

13. The computer-readable non-transitory medium of claim 11, wherein the network flow uses an unreliable protocol and intercepting the network flow comprises caching a first packet of the flow until the metadata is sent.

14. The computer-readable non-transitory medium of claim 11, wherein the metadata is sent using a Datagram Transport Layer Security protocol.

15. The computer-readable non-transitory medium of claim 11, wherein the operations further comprise:
receiving a discovery redirect from a second firewall; and
sending the metadata to the second firewall over a metadata channel.

16. The computer-readable non-transitory medium of claim 11, wherein the operations further comprise:
receiving a discovery redirect from a second firewall;
updating a firewall cache to identify the second firewall for managing the route to the destination; and
sending the metadata to the second firewall over a metadata channel.

17. The computer-readable non-transitory medium of claim 11, wherein the operations further comprise:
receiving a discovery redirect from a second firewall; and
sending the metadata to the second firewall using a Datagram Transport Layer Security protocol.

18. The computer-readable non-transitory medium of claim 11, wherein the operations further comprise:
receiving a discovery redirect from a second firewall;
authenticating the discovery redirect with a message authentication code; and
sending the metadata to the second firewall over a metadata channel.

19. The computer-readable non-transitory medium of claim 11, wherein the operations further comprise:
receiving a discovery redirect from a second firewall;
authenticating the discovery redirect with a public key decryption of a hash of the discovery redirect; and
sending the metadata to the second firewall over a metadata channel.

20. The computer-readable non-transitory medium of claim 11, wherein the operations further comprise:
caching a first packet in the network flow;
receiving a discovery redirect from a second firewall;
sending the metadata to the second firewall over a metadata channel; and
sending the first packet to the second firewall.

21. The computer-readable non-transitory medium of claim 11, wherein the operations further comprise:
receiving a discovery redirect from a second firewall;
updating a firewall cache to identify the second firewall for managing the route to the destination; and
sending the metadata to the second firewall over a metadata channel; and
wherein updating the firewall cache comprises adding a new entry for the destination node with a mask length incrementally modified over a prior entry for the destination node.

* * * * *